V. L. P. A. M. MANSFELD.
CINEMATOGRAPHIC DISPLAY APPARATUS.
APPLICATION FILED NOV. 26, 1913.
1,166,701.
Patented Jan. 4, 1916.
4 SHEETS—SHEET 1.
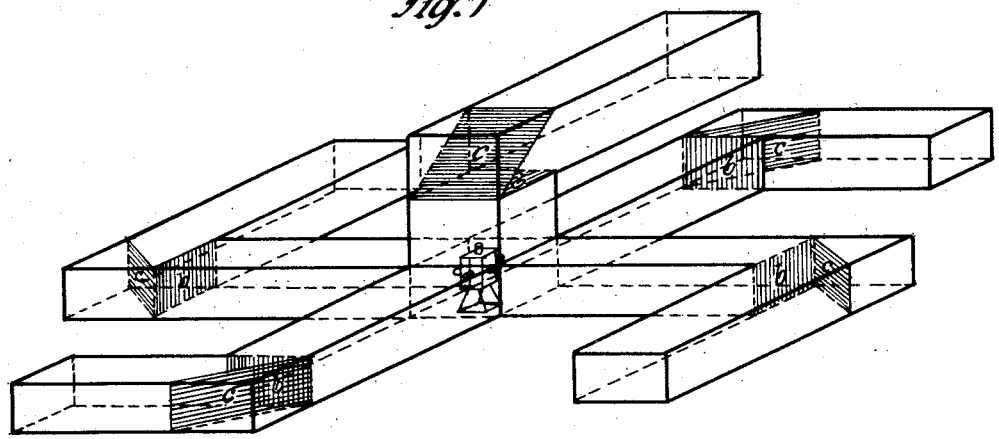
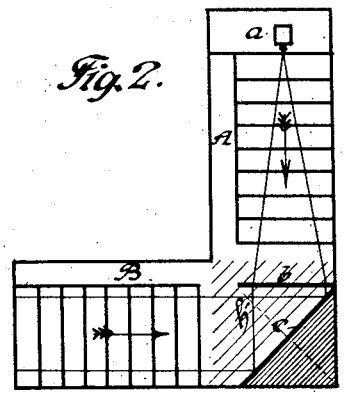
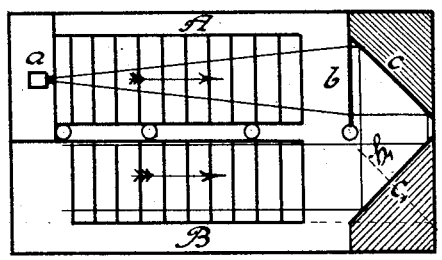
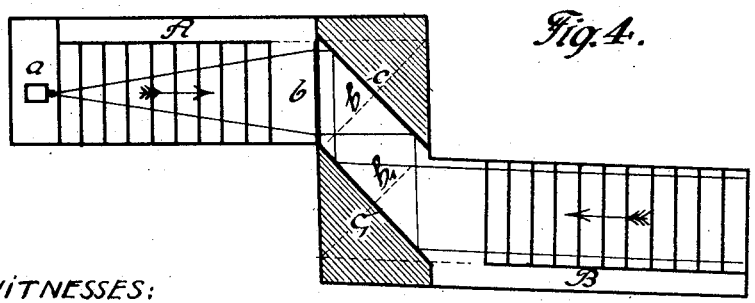
WITNESSES:
INVENTOR V. L. P. A. M. MANSFELD.
CINEMATOGRAPHIC DISPLAY APPARATUS.
APPLICATION FILED NOV. 26, 1913.

1,166,701.

Patented Jan. 4, 1916.
4 SHEETS—SHEET 4.

WITNESSES:
M. J. Whittaker
G. M. Hulit

INVENTOR
V. L. P. A. M. Mansfeld
BY H. W. Waghorn
ATTORNEY.

UNITED STATES PATENT OFFICE.

VICTOR LUDWIG PHILIPP AUGUST MAXIMILIAN MANSFELD, OF BERLIN-STEGLITZ, GERMANY.

CINEMATOGRAPHIC DISPLAY APPARATUS.

1,166,701.  Specification of Letters Patent.  Patented Jan. 4, 1916.

Application filed November 26, 1913. Serial No. 803,182.

*To all whom it may concern:*

Be it known that I, VICTOR LUDWIG PHILIPP AUGUST MAXIMILIAN MANSFELD, a subject of the Emperor of Germany, residing at Birkbuschstrasse 87, Berlin-Steglitz, in the Empire of Germany, have invented certain new and useful Improvements in Cinematographic Display Apparatus, of which the following is a specification.

The present invention relates to means for exhibiting pictures by projection, which consist of a plurality of audience rooms contiguous to each other, in one of which audience rooms a translucent screen is arranged, reflecting means being associated with the said screen in such a manner that the images appearing on the back side of the screen may be seen in another audience room.

The audience rooms may be arranged angularly or parallel to each other, or they may be located adjacent or in series or superposed.

In order to render the present invention more easily intelligible reference is had to the accompanying drawings in which several modes of embodying the invention are illustrated.

Figure 5:
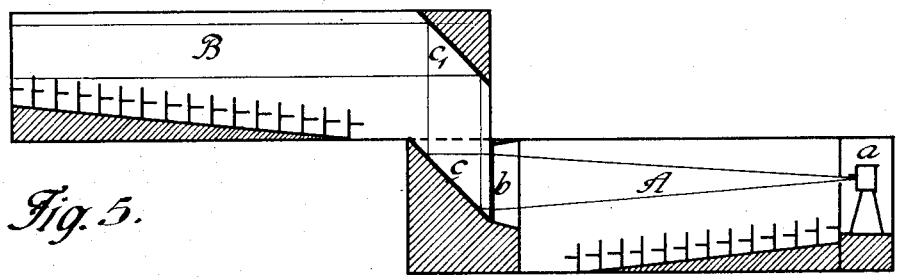
Figure 6:
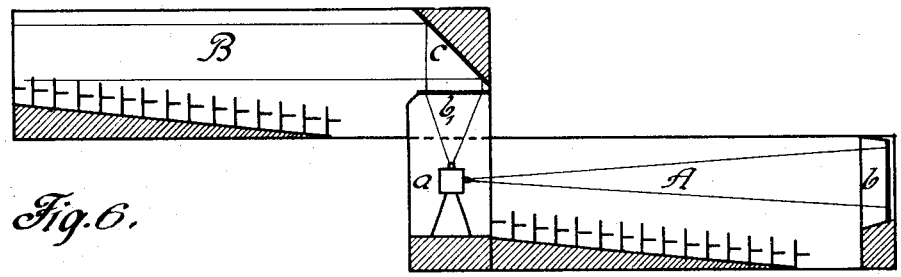
Figure 7:
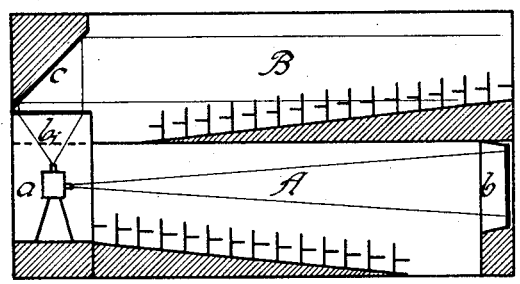

Figure 1 is a perspective view of a grouping of nine rooms. Fig. 2 a plan of two rooms, grouped rectangularly to each other. Fig. 3 shows two rooms arranged side by side and Fig. 4 two rooms arranged partly side by side and partly one after the other. Figs. 5 and 6 two rooms arranged partly superposed and partly one after the other. Fig. 7 shows two superposed rooms and Fig. 8 two rooms arranged at a pointed angle against each other. Figs. 9 to 14 show various groupings of three audience rooms.

I will now describe my invention more fully and, as the most clear and simple example, I take Fig. 2, which shows two rectangularly arranged audience rooms. According to this figure A and B are the two audience rooms $a$ is the projecting apparatus located at the rear end of the one audience room A. In the hatched room portion (common to both audience rooms) a translucent projection screen $b$ and planemirror $c$ are arranged. The following rule gives good results for properly transferring the pictures into the audience room B: The mirror $c$ is located at right angles and symmetrically to the line $h$ halving the angle formed by the outer walls of the two rectangular audience rooms. The translucent screen $b$ is arranged exactly vertically to the longitudinal direction of that room in which the projection apparatus is positioned. Besides it is necessary that the translucent screen $b$ is arranged so as to be as near to the mirror $c$ as possible. By this is effected that the spectators in the audience room A see the pictures as usually on the front side of the translucent screen $b$. On the rear side of the said screen this picture will appear reversed from the left to the right. The picture then displayed upon the mirror will appear there properly again and is reflected into the audience room B undistorted and unshortened, also with directly readable writing and print.

I suppose the description of Fig. 2 will be quite sufficient to transmit the necessary understanding of the invention. It is evident that sometimes the projecting apparatus must be provided with two or more objectives, and that the translucent screen must be combined sometimes with two mirrors in order to transfer the pictures into all the desired combinations of audience rooms.

Figure 10:
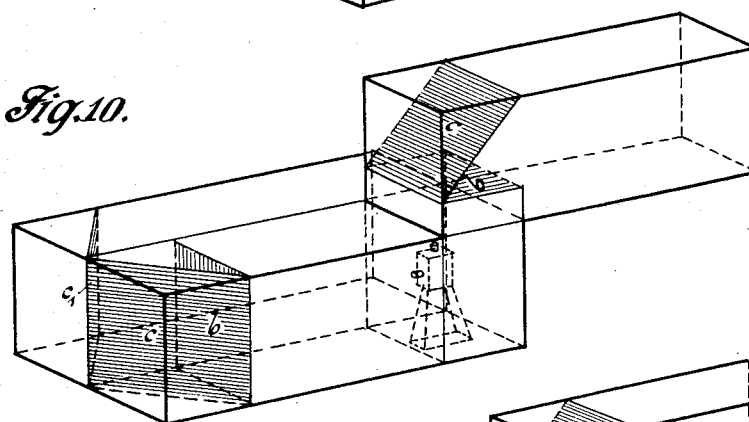
Figure 11:
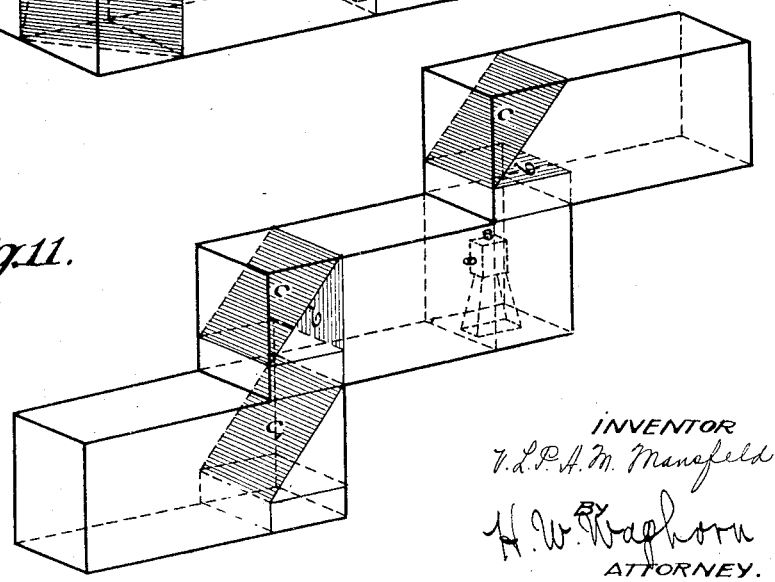
Figure 12:
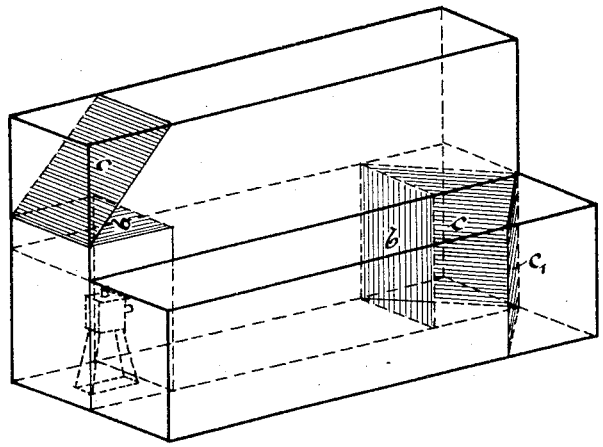
Figure 13:
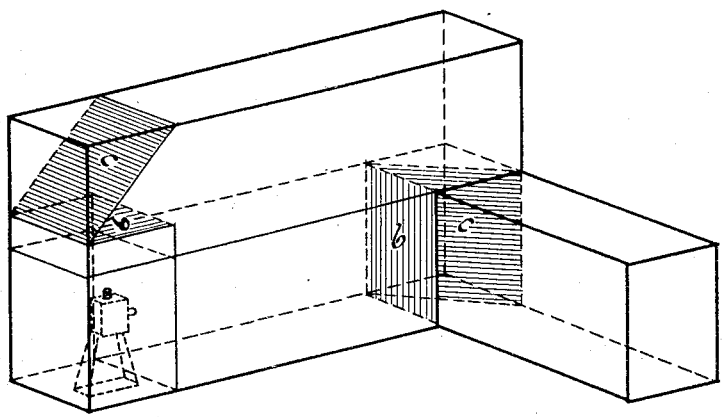
Figure 14:
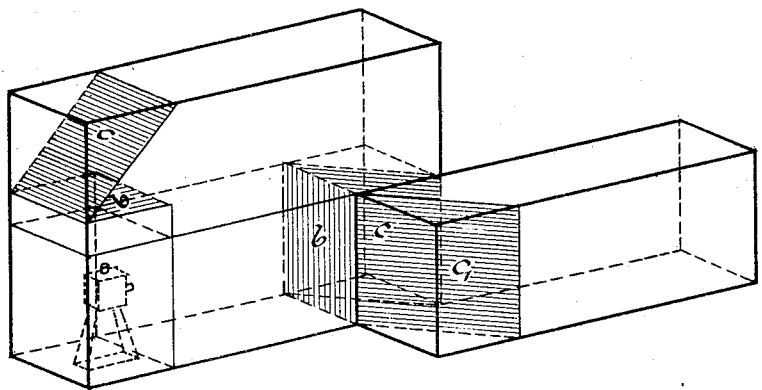

If there are employed two mirrors according to Figs. 3, 4, 5 and partly in Figs. 10, 12, 14, in the audience room, in which the projection apparatus is not located, the pictures will appear reversed from the left to the right as on the back side of the translucent screen. Besides the picture appears a little smaller and also a little darker, but nevertheless exactly sharp and on a whole just as good a picture as on the front side. The writing or print may be read to the spectators for example from the front side of the translucent screen $b$ by somebody, who abides in the other wing room.

Figure 8:
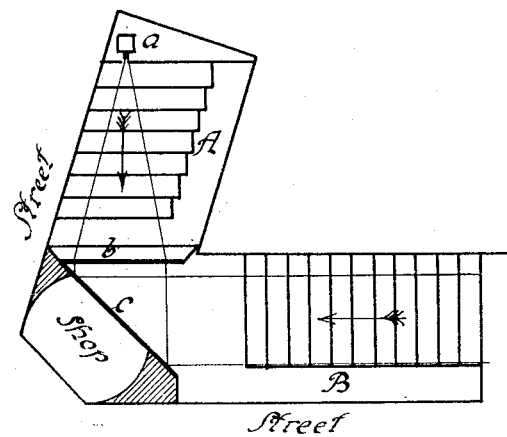
Figure 9:
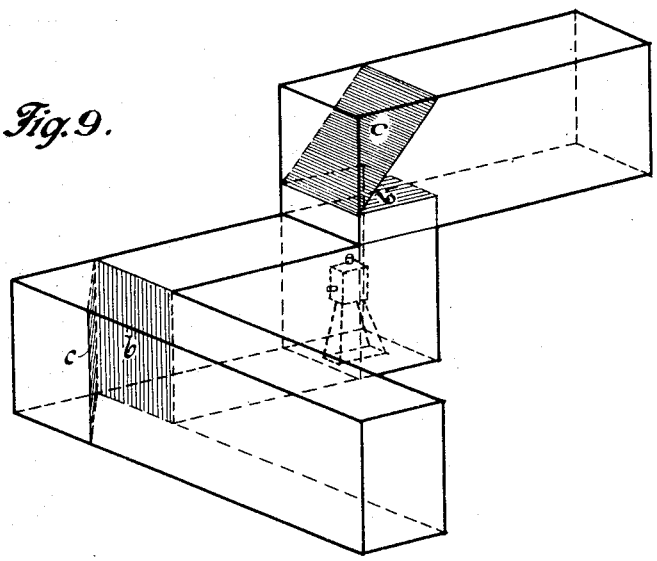

In certain cases it may not be desirable to arrange the rows of seats at right angles to the longitudinal direction of the room, but in the manner shown in Fig. 8. In this case an ideal wing room is implied by wing room, the longitudinal direction of which is at right angles to the longitudinal direction of the rows of seats.

I claim—

1. Means for exhibiting pictures by projection, comprising a plurality of audience rooms contiguous to each other, a translucent screen at the end of one audience room and reflecting means associated with said screen, whereby the images appearing on the back side thereof may be in another audience room.

2. In an apparatus for displaying cinematographic pictures to be visible in two audience rooms arranged at right angles, the combination of one single projection apparatus $a$, located in the rear part of the one audience room, a translucent screen $b$, arranged at right angles to this said audience room and in line with the other audience room, and a non-transparent plane-mirror $c$ arranged at an angle of 45° to and behind the translucent screen, substantially as described.

In testimony whereof I affix my signature in presence of two witnesses.

VICTOR LUDWIG PHILIPP
AUGUST MAXIMILIAN MANSFELD.

Witnesses:
WOLDEMAR HAUPT,
HENRY HASPER.

Copies of this patent may be obtained for five cents each, by addressing the "Commissioner of Patents, Washington, D. C."